Figure 1:
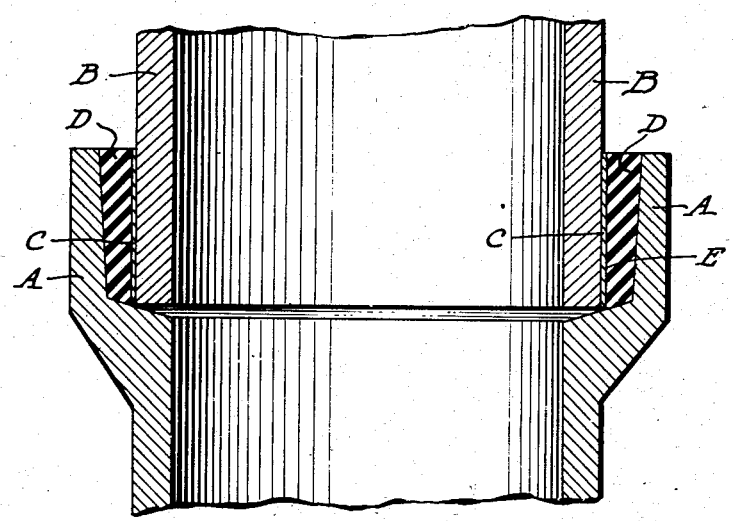

Jan. 30, 1945.   A. C. FISCHER   2,368,610
JOINING PIPE SECTIONS
Filed March 14, 1942

Inventor
ALBERT C. FISCHER
By Knight Bros
Attorney

Patented Jan. 30, 1945

2,368,610

UNITED STATES PATENT OFFICE 2,368,610

JOINING PIPE SECTIONS

Albert C. Fischer, Chicago, Ill.

Application March 14, 1942, Serial No. 434,721

7 Claims. (Cl. 18—59)

This invention relates to the preparation of pipe joints having particular utility in the field of pipe sections of smaller sizes having wide application in domestic installations, wherein an economical sealed flexible joint between pipe sections is attained.

It is the object of the present invention to simplify the preparation of packings which are employed in joining together and laying up of sewer pipes of either iron or clay construction, which may be executed economically and rapidly by preparing the joints in the field, or in the factory preparatory to executing the final joining operations in the field. While the invention is of particular utility in its application to pipes of approximately 6" in diameter, the same may also be used in pipes of larger sizes, such as 18" or 24" diameters.

Heretofore it has been the practice to use dams for pouring compounds into the pipe joints. Other methods have included the use of dies in which the spigot and bell end of the pipe were placed in various positions and the compound poured about these dies. My present invention relates to the elimination of both use of bands, dams and the like, as well as dies and presents a simplification over such arrangements as are disclosed in my co-pending application, Serial No. 330,769, filed April 20, 1940.

My invention proceeds upon the principle of preparing a sealing band or lining upon the interior lateral surface of the bell end of a pipe section with the aid of the spigot end of another pipe section while leaving the exterior surface of the spigot end clear of any packing material, until the pipe sections are ready to be joined in the field, whereupon the re-insertion of the spigot end into the lined bell end, with possible conditioning of one, both or neither of the juxtaposed surfaces, effectuates the desired junction between the pipe sections. This conditioning may consist of coating a thin layer or film of plastic material upon the exterior of the spigot end of one pipe section to act as a cooperating binder with the lining upon the bell and to effect a joint between the two pipe sections. Other joining expedients are set forth below.

The molding of the packing or lining is executed by disposing one pipe section with the bell end up and another pipe section thereabove with its spigot end down, resting above the lower pipe with the spigot end of the upper pipe inserted into the bell end of the lower pipe. The spigot end of the pipe may be protected by a band of whiting in either powdered form or in the form of a layer developed by dipping in a suitable solution, a band of paper or textile fabric surrounding the spigot end of the pipe, or saturated bands of textile material such as felt. The space between the spigot end of the upper pipe and the bell end of the lower pipe is filled with a plastic filler which may be of a bituminous nature or other compound such as cement or concrete. When paper or felt bands are employed to protect the spigot end of the upper pipe section, the same adhere to the plastic filler which is poured into the space between the pipe sections, and after the pouring operation and setting by cooling or the lapse of time, the upper pipe section may be removed, leaving the sealing ring molded within the bell end of the pipe section. If paper bands are employed, these may be stripped from the packing surface immediately, or prior to the execution of the joining operation; in some instances the same may be retained in place to be embodied in the joint. In view of the fact that no dies are employed, the mass of material in both the upper and lower pipe sections quickly absorb the heat from the heated plastic material, if such is used, to render the pouring and cooling operation a rapid one preparatory to the next succeeding operation when the upper pipe section may constitute the lower section of a pair for the purpose of molding a packing or lining upon the interior of the bell end thereof. Thereupon the pipes may be stored until ready for utilization in the field or set aside after the molding operation preparatory to the joining of the several sections of them. When protective bands of paper or felt are used, such act as a reinforcement upon the liners in the bell ends of the pipes and facilitate the withdrawal of the spigot end of the cooperating pipe while assuring a more rigid and permanently centered lining in the bell end.

Figure 2:
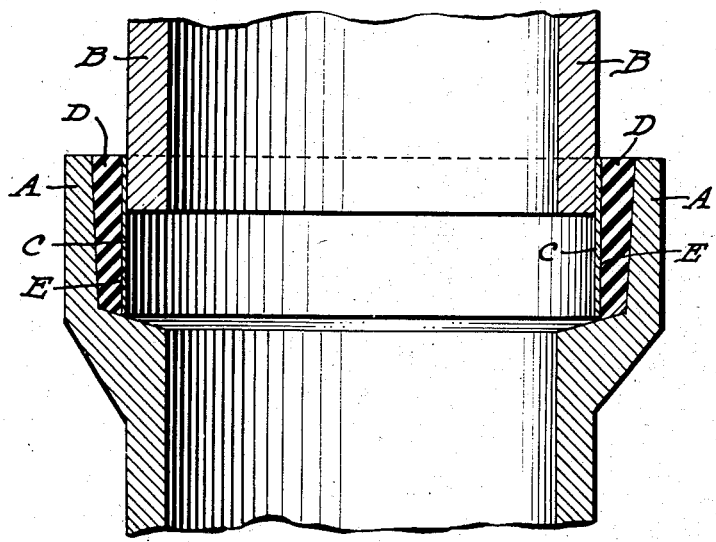

Other objects and purposes will appear from the detailed description of the invention following hereinafter taken in conjunction with the accompanying drawing, wherein Fig. 1 is a vertical sectional view of the pipe sections in the course of the molding operation of the lining upon the interior of the bell end of the lower pipe section, and Fig. 2 is a corresponding vertical sectional view illustrating the withdrawal of the spigot end of the upper pipe section from the bell end of the lower pipe section.

In the drawing is shown the bell end A of a lower pipe section which may be supported upon a platform, table or floor, which is superposed by the spigot end of an upper pipe section B, the external lateral surface of which cooperates with the interior of the bell end to form a molding chamber for the reception of the material constituting the packing layer D which preferably is poured into the space between the bell end and the spigot end of the lower and upper pipes, respectively. In order to facilitate the withdrawal of the spigot end of the upper pipe section following the molding operation, a band of felt or paper C is mounted upon the exterior surface of the spigot end of the pipe section B prior to its insertion into the bell end of the pipe section and preceding the molding operation. This protective layer C adheres to the formed liner at the surface E as shown in Fig. 2, and the opposite surface thereof may be suitably treated to render the same non-adhesive with respect to the lateral surface of the pipe section B after the molding operation. The liner C may remain attached to the packing until the same is ready for joining to another pipe section and serves to maintain the packing in good condition. This liner may be treated at the time of the molding operation or subsequently thereto, to render the same tacky and adhesive upon the insertion of the bell end of a pipe section. Alternatively when this liner is made of paper, the same may be stripped at the surface E from the packing D in order to uncover the packing for direct contact with a suitable adhesive which may be applied to the spigot end of an adjoining pipe section, which is highly desirable when a bituminous or asphalt junction is made between the same material of different viscosities applied to the spigot end and to the lining on the bell end. When the protective layer C consists of saturated felt, the nap thereof may be conditioned for joining with the spigot end of pipe B in coated or uncoated state, depending upon the character of the treating agent with which the protective band C is impregnated.

In lieu of the band C, a layer of whiting may be disposed upon the end of the pipe section B which permits a stripping of the pipe section from the lining D following the molding operation. When such is used, it is preferable that the whiting be wiped from the inner surface of the lining D to permit better cohesion therebetween and the coated end of the pipe B when the same is inserted into the bell end for the execution of the joining operation.

The liner C may be of such material and may be of such fluid consistency that while the same permits the spigot end of the pipe section B to be withdrawn therefrom at the end of the molding operation of the lining D, exposure of the same to the atmosphere will render the same tacky so that upon insertion of the spigot end of the pipe section B, good adhesion will take place. Should this adhesive surface tend to become dried out, the spreading of a solvent such as benzol, kerosene and the like will bring the same back to an adhesive state, as is well known in the prior art.

When the pipe sections as prepared above are ready for joining, a suitable compound may be placed upon the spigot end of the pipe by means of a brush, spray, dip or the like, which end is then set into the bell end of the pipe containing the sealing or packing ring molded therein. Thereby a permanent seal is effected between the two sections of the pipe. The compound may be of the same type as the packing of bell end but of lighter consistency or of a solvent therefor. Furthermore, the spigot end may be clean and the bell end may be rendered adhesive by newly applied coatings of plastics or solvents or may be inherently adhesive from the time of original fabrication.

The packing in the bell end of the pipe may be formed of two types of material. This material may be a bituminous compound which is poured into the bell end and which will substantially harden sufficiently to support the spigot end of a pipe. This may be in the nature of a bituminous compound, a bituminous rubber compound, or even a Portland cement compound, any of which constitute satisfactory filler materials for supporting the pigot end of the pipe. The other cooperating filler which is preferably applied to the spigot end of the pipe at the time of completing the joint may be in the nature of a soft material which may be a varnish produced by cutting back various types of rubber asphalt compounds, a bituminous emulsion, or any suitable varnish composition. In view of the fact that the spacing between the packing of the bell end of the pipe and the spigot end of the juxtaposed pipe section is a minimum, a film on the exterior surface of the latter would practically effect a bond between the pipe sections. The same result is attainable by a swelling of the contacting surface of the packing material by the application of a solvent or swelling agent thereupon.

The softer coating material which may be applied to the spigot end of the pipe section is designed to cooperate effectively with the harder filler disposed upon the inside of the bell section whether the same is unlined or lined with a saturated felt band, bituminous rubber band, bituminous cloth band, fabric or plain ordinary, unsaturated paper which has been caused to adhere to the packing in the bell end while stripping the spigot end of the upper pipe section from the bell end of the lower one after molding operation. When whiting is employed to prevent adhesion between the spigot end and the packing it is advisable to wipe off the same at the time of joining the pipe sections. In the cases where plain ordinary, unsaturated paper is utilized as a protective strip, the sealing coating which is subsequently applied to the spigot end of the pipe must be such as to modify this paper to produce a tight seal between the soft sealing medium of the former and the harder packing material of the liner of the pipe. The paper or felt may be impregnated with a self-conditioning adhesive composition from which the spigot end may be stripped easily on account of the fluidity of the composition but which may be sufficiently tacky to adhesively embrace the spigot end of the pipe when the same is re-inserted therein. Of course, such adhesive material may be applied also at the time that the joining operation is undertaken.

Suitable formulae for the compound constituting the filler in the bell end of the pipe are as follows:

Sewer Compound B

| | Per cent |
|---|---|
| Asphalt 180° | 44.5 |
| Clay | 55.5 |

G. K.

| | Per cent |
|---|---|
| Asphalt 180° | 39.0 |
| Asphalt 220° | 13.0 |
| Clay | 45.0 |
| Asbestos | 3.0 |

2 in 1

|  | Per cent |
|---|---|
| Asphalt 248° | 34.3 |
| H. R. 300° | 7.1 |
| Flux 120° | 8.6 |
| Clay | 50.0 |

The softer binder is made by cutting back the original material in any kind of solvent miscible with asphalt in proportion 3-5 parts of original material to 1 part of solvent. The solvent penetrates the outer, harder material leaving asphalt residue as binder.

The present method for preparing pipe for joining and the execution of the joining step lends itself well to all forms of domestic piping of lighter nature whether the same is formed of concrete, clay, cast iron or other material. Portland cement may be used as the filler, or one of the fillers, in making the joint. While Portland cement may be utilized as the filler, after the Portland cement is set it should be painted over with an asphalt coating. It is preferable to have asbestos fibre, glass wool or cotton fibre mixed in with the Portland cement. Where hot-poured compounds are preferred bituminous compounds are preferable and recommended.

While I have described my invention as embodied in specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. The method of joining the spigot end of a pipe section to the bell end of a juxtaposed pipe section which comprises forming a lining upon the interior of the bell end of the second pipe section while the spigot end of the first pipe section is disposed therein, withdrawing the first pipe section following the forming operation, and re-inserting the spigot end into the lined bell end at the time of joining the two pipe sections together.

2. The method of joining the spigot end of a pipe section to the bell end of a juxtaposed pipe section which comprises forming a plastic lining upon the interior of the bell end of the second pipe section while the spigot end of the first pipe section is disposed therein, withdrawing the first pipe section following the forming operation, and re-inserting the spigot end into the lined bell end after conditioning at least one of the contacting surfaces of the spigot end and the lining to effect an adhesion therebetween.

3. The method of joining the spigot end of a pipe section to the bell end of a juxtaposed pipe section which comprises pouring a heated bituminous lining upon the interior of the bell end of the second pipe section while the spigot end of the first pipe section is disposed therein, withdrawing the first pipe section after the lining has cooled, coating the spigot end of the first pipe section with a plastic film preparatory to the joining operation, and re-inserting the spigot end into the lined bell end to effect a tightly sealed homogeneous joint between the two pipe sections.

4. The method of joining the spigot end of a pipe section to the bell end of a juxtaposed pipe section which comprises molding a plastic lining upon the interior of the bell end of the second pipe section while the spigot end of the first pipe section is disposed therein, said spigot end being provided with a protective layer to prevent adhesion of the lining thereto, withdrawing the first pipe section following the molding operation, and re-inserting the spigot end into the lined bell end after conditioning the external surface of the spigot end for adhesive contact with said plastic lining.

5. The method of joining pipe sections as set forth in claim 4, wherein the protective layer consists of a body of whiting coated upon the spigot end of the first pipe section.

6. The method of joining the spigot end of a pipe section to the bell end of a juxtaposed pipe section which comprises molding a plastic lining upon the interior of the bell end of the second pipe section while the spigot end of the first pipe section is disposed therein, said spigot end being provided with a protective layer in the form of a web to prevent adhesion of the lining to the spigot end, withdrawing the first pipe section following the molding operation, removing the protective web from the plastic lining preparatory to the joining operation and re-inserting the spigot end into the lined bell end after conditioning at least one of the contacting surfaces of said ends for tight adhesion therebetween.

7. The method of joining the spigot end of a pipe section to the bell end of a juxtaposed pipe section which comprises molding a plastic lining upon the interior of the bell end of the second pipe section while the spigot end of the first pipe section is disposed therein, said spigot end being provided with a protective web to prevent adhesion of the lining thereto, withdrawing the first pipe section following the molding operation, and re-inserting the spigot end into the lined bell end after conditioning the protective web by impregnation with a plastic agent or revivifying agent therefor to effect a tightly sealed adhesion between the two pipe sections.

ALBERT C. FISCHER.